(12) United States Patent
Meng et al.

(10) Patent No.: US 11,112,557 B2
(45) Date of Patent: Sep. 7, 2021

(54) LIGHT GUIDE STRUCTURE, DIRECT TYPE BACKLIGHT MODULE AND DISPLAY PANEL

(71) Applicant: BOE TECHNOLOGY GROUP CO., LTD., Beijing (CN)

(72) Inventors: Xiandong Meng, Beijing (CN); Wei Wang, Beijing (CN); Xiaochuan Chen, Beijing (CN); Jifeng Tan, Beijing (CN); Jian Gao, Beijing (CN); Xianqin Meng, Beijing (CN); Pengxia Liang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 298 days.

(21) Appl. No.: 16/323,878

(22) PCT Filed: May 14, 2018

(86) PCT No.: PCT/CN2018/086652
§ 371 (c)(1),
(2) Date: Feb. 7, 2019

(87) PCT Pub. No.: WO2019/062137
PCT Pub. Date: Apr. 4, 2019

(65) Prior Publication Data
US 2021/0011213 A1    Jan. 14, 2021

(30) Foreign Application Priority Data
Sep. 27, 2017    (CN) .......................... 201710890688.9

(51) Int. Cl.
*F21V 8/00*    (2006.01)
*G02B 6/27*    (2006.01)
(Continued)

(52) U.S. Cl.
CPC ......... *G02B 6/0076* (2013.01); *G02B 6/0023* (2013.01); *G02B 6/0051* (2013.01);
(Continued)

(58) Field of Classification Search
CPC .. G02B 6/0076; G02B 6/0023; G02B 6/0051; G02B 6/27; G02B 6/2773; G02B 27/283;
(Continued)

(56) References Cited

U.S. PATENT DOCUMENTS 8,251,563 B2    8/2012 Papakonstantinou et al.
2009/0040422 A1*    2/2009 Misono .................. G02B 6/005
349/62

(Continued)

FOREIGN PATENT DOCUMENTS

CN    201437941 U    4/2010
CN    105404053 A    3/2016
(Continued)

OTHER PUBLICATIONS

International Search Report and Written Opinion dated Jul. 18, 2018, from application No. PCT/CN2018/086652.
(Continued)

*Primary Examiner* — Donald L Raleigh
(74) *Attorney, Agent, or Firm* — Arch & Lake LLP

(57)    ABSTRACT

A light guide structure is disclosed. The light guide structure includes a first waveguide layer having a first light incident surface and a first light exiting surface. The light guide structure includes a polarization beam-splitting structure on the first light exiting surface, configured to split light into first polarized light and second polarized light. The light guide structure includes a first polarization coupling grating disposed on the first light incident surface and configured to deflect the first polarized light, and a second waveguide layer having a second light incident surface and a second
(Continued)

light exiting surface and disposed on the polarization beam-splitting structure. The light guide structure includes a second polarization coupling grating disposed between the second light incident surface and the polarization beam-splitting structure and configured to deflect the second polarized light.

20 Claims, 8 Drawing Sheets

(51) Int. Cl.
  *G02B 27/28*  (2006.01)
  *G02B 27/42*  (2006.01)
  *G02F 1/13357*  (2006.01)
  *G02F 1/29*  (2006.01)
  *G02F 1/1335*  (2006.01)
(52) U.S. Cl.
  CPC ............ *G02B 6/27* (2013.01); *G02B 6/2773* (2013.01); *G02B 27/283* (2013.01); *G02B 27/4233* (2013.01); *G02B 27/4272* (2013.01); *G02F 1/13362* (2013.01); *G02F 1/29* (2013.01); *G02F 1/13355* (2021.01); *G02F 2201/305* (2013.01)
(58) Field of Classification Search
  CPC  G02B 27/4233; G02B 27/4272; G02B 27/28; G02F 1/13362; G02F 1/29; G02F 1/13355; G02F 2201/305
  See application file for complete search history.

(56)  References Cited

U.S. PATENT DOCUMENTS

| | | | |
|---|---|---|---|
| 2010/0302798 A1* | 12/2010 | Papakonstantinou | ....................... G02B 6/0076 362/601 |
| 2017/0248790 A1 | 8/2017 | Cheng | |
| 2018/0299729 A1* | 10/2018 | Zha | ................... G02F 1/133553 |
| 2020/0166680 A1 | 5/2020 | Meng et al. | |

FOREIGN PATENT DOCUMENTS

| | | |
|---|---|---|
| CN | 107193070 A | 9/2017 |
| CN | 107608134 A | 1/2018 |
| JP | 2007-178829 A | 7/2007 |

OTHER PUBLICATIONS

Extended European Search Report issued in European Application No. 1889665.9 date May 11, 2021, (7p).

* cited by examiner

LIGHT GUIDE STRUCTURE, DIRECT TYPE BACKLIGHT MODULE AND DISPLAY PANEL

CROSS-REFERENCE TO RELATED APPLICATIONS

The present disclosure is based on International Application No. PCT/CN2018/086652, filed on May 14, 2018, which is based upon and claims priority to Chinese Patent Application No. 201710890688.9, filed Sep. 27, 2017, the entire contents of which are incorporated herein by reference.

TECHNICAL FIELD

The present disclosure relates to display technologies, and more particularly, to a light guide structure, a direct type backlight module mounted with the light guide structure, and a display panel mounted with the direct type backlight module.

BACKGROUND

With the rapid expansion of the market of LED liquid crystal display products, the requirement of consumers for LED liquid crystal televisions has become increasingly higher. Manufacturers of the LED liquid crystal televisions are required to continuously make new breakthroughs on both image quality experience and appearance design. LED backlight modules are mainly classified into side light type LED backlight and direct type LED backlight. The side light type LED backlight has advantages of thin and light, but the image quality thereof cannot achieve the desired effect. The direct type LED backlight can use its own advantages and achieve image quality optimization by local dimming, but the direct type LED backlight still has room for improvement.

The foregoing information disclosed in Background are only for the purpose of enhancement of the understanding of the background of the present disclosure and therefore the information can include information that does not constitute the prior art already known to those of ordinary skill in the art.

SUMMARY

Additional aspects and improvements of the present disclosure will be set forth in part in the following descriptions and will be apparent from the descriptions partially, or can be learned by the practice of the present disclosure.

According to an aspect of the present disclosure, there is provided a light guide structure. The light guide structure includes a first waveguide layer having a first light incident surface and a first light exiting surface. The light guide structure includes a polarization beam-splitting structure disposed on the first light exiting surface. The polarization beam-splitting structure is configured to split light emitted from a light source into first polarized light and second polarized light. The light guide structure includes a first polarization coupling grating disposed on the first light incident surface. The first polarization coupling grating is configured to deflect the first polarized light and allow the first polarized light to be totally reflected in the first waveguide layer. The light guide structure includes a second waveguide layer having a second light incident surface and a second light exiting surface and disposed on the polarization beam-splitting structure. The light guide structure includes a second polarization coupling grating disposed between the second light incident surface and the polarization beam-splitting structure. The second polarization coupling grating is configured to deflect the second polarized light and allow the second polarized light to be totally reflected in the second waveguide layer.

In an exemplary arrangement of the present disclosure, the first polarized light has a polarization direction perpendicular to an incident surface, and the second polarized light has a polarization direction parallel to the incident surface.

In an exemplary arrangement of the present disclosure, the first polarization coupling grating includes a reflection grating layer disposed on the first light incident surface. The second polarization coupling grating includes a transmission grating layer disposed on the second light incident surface.

In an exemplary arrangement of the present disclosure, the transmission grating layer and the reflection grating layer each includes a plurality of concentric annular gratings. The plurality of concentric annular grating have different parameters.

In an exemplary arrangement of the present disclosure, the light source, the first polarization coupling grating and the second polarization coupling grating are disposed about a concentric axis.

In an exemplary arrangement of the present disclosure, the polarization beam-splitting structure includes a metal grating layer disposed on the first light exiting surface.

In an exemplary arrangement of the present disclosure, parameters of the metal grating layer include a period of 200 nm, a grid height of 130 nm, and a duty ratio of 0.5.

In an exemplary arrangement of the present disclosure, the light guide structure further includes a first mesh layer disposed at a position of the first light exiting surface where no polarization beam-splitting structure is provided and/or a position of the first light incident surface where no first polarization coupling grating is provided.

In an exemplary arrangement of the present disclosure, the light guide structure further includes a second mesh layer disposed at a position of the second light exiting surface and/or the second light incident surface where no second polarization coupling grating is provided.

According to an aspect of the present disclosure, there is provided a direct type backlight module. The direct type backlight module includes the light guide structure according to any one of foregoing, and a light source disposed opposite to the first waveguide layer and located between the first light incident surface and the first polarization coupling grating.

In an exemplary arrangement of the present disclosure, the light guide structure further includes a second mesh layer, which is disposed at a position of the second light exiting surface and/or the second light incident surface where no second polarization coupling grating is provided. The direct type backlight module further includes a fluorescent layer disposed on a side of the second mesh layer away from the second waveguide layer.

In an exemplary arrangement of the present disclosure, the direct type backlight module further includes a diffusion sheet disposed on a side of the fluorescent layer away from the second mesh layer. The direct type backlight module further includes a prism layer disposed on a side of the diffusion sheet away from the fluorescent layer. The direct type backlight module further includes a reflective layer disposed on a side of the first polarization coupling grating away from the first waveguide layer. According to an aspect of the present disclosure, there is provided a display panel that includes the direct type backlight module of any one of the above.

BRIEF DESCRIPTION OF THE DRAWINGS

The above-described and other features and improvements of the present disclosure will become more apparent from the detailed descriptions of exemplary arrangements of the present disclosure with reference with the accompanying drawings.

DETAILED DESCRIPTION

Figure 1:
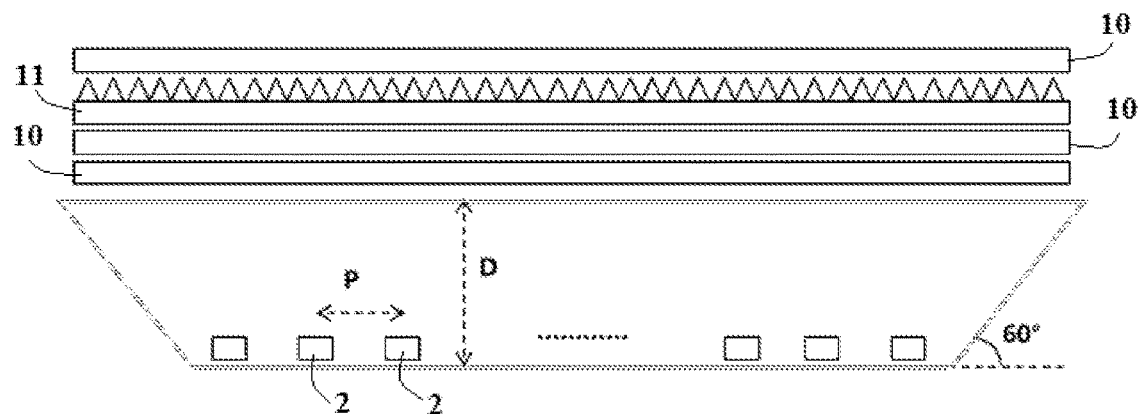
FIG. 1 is a schematic structural diagram illustrating a direct type backlight module.

Exemplary arrangements will now be described more fully with reference to the accompanying drawings. However, the exemplary arrangements may be embodied in a variety of forms and should not be construed as being limited to the arrangements set forth herein. On the contrary, the arrangements are provided to make the present disclosure comprehensive and through and to fully convey the concept of the exemplary arrangements to those skilled in the art. The same reference signs in the drawings denote the same or similar structures, and detailed descriptions thereof will be omitted.

FIG. 1 is a schematic structural diagram illustrating a direct type backlight module, and more specifically, a direct type LED backlight module.

As shown in FIG. 1, in the direct type LED backlight module, a LED array is directly arranged at the bottom of a backlight cavity, by mixing light at a certain height, light emitted from each LED 2 can form a uniform light energy distribution at the top of the backlight cavity. In order to achieve cost saving and power consumption reduction, a distance P between two adjacent LEDs 2 is set to be large. Additionally, in order to ensure excellent uniformity of light outgoing, a specified distance D is set between the LED 2 and a first layer of diffusion sheet 10. The distance between the LED 2 and the first layer of diffusion sheet 10 is determined according to the empirical formula: $D/P>1.2$. Taking an 82-inch product as an example, the distance P between two LEDs is 2.2 cm, in order to allow the module to emit light uniformly, the value of D is greater than $2.2*1.2=2.64$ cm, which greatly increases a thickness of the backlight module and thus reduces market competitiveness of the products. The current direct type LED backlight module requires a long light mixing distance, which is generally greater than 20 mm, this is against the thinness and lightness of a flat panel display. Moreover, light is reflected many times in the propagation, and the loss of light energy is considerable. In the 82-inch product described-above, the reflectivity of an inner wall of the backlight cavity is as high as 95%, but about 25% of the light energy is lost during the reflection process in the backlight cavity, which is not beneficial for exploiting the advantages of energy saving and environment protection of the LED backlight to the full.

In the processing of direct type LED backlight, the Local dimming technology can greatly reduce power consumption, improve imaging contrast, increase the number of gray-scales, and reduce image sticking. The main principle of implementing the technology is to divide the LCD backlight into N small blocks. During operation, a luminance contrast of the backlight is adjusted according to a gray level of liquid crystal display contents corresponding to a corresponding small block, thus achieving the purpose of energy saving and improving the image quality.

When the LCD is used as a light-transmitting display device, the backlight module is required to provide brightness desired for display. For most liquid crystal displays, a backlight module thereof always shines, and due to the limitations of their own characteristics, there are problems such as light leakage and the like at various extents, which may affect the performance of shadow detail and contrast.

The present disclosure provides a light guide structure, a direct type backlight module in which the light guide structure is mounted, and a display panel in which the direct type backlight module is mounted, in order to solve at least one of technical defects related to the LCD backlight discussed above.

Figure 2:
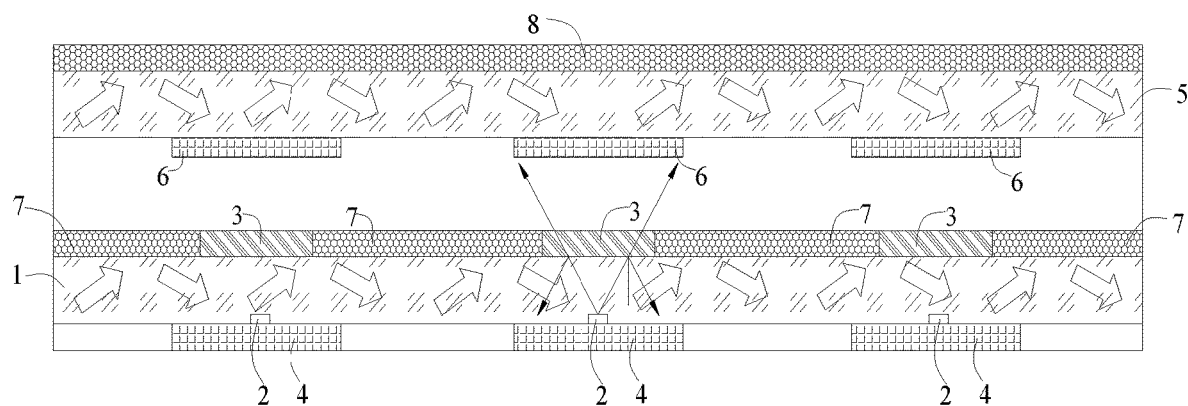
FIG. 2 is a schematic structural diagram illustrating a light guide structure according to an arrangement of the present disclosure.

FIG. 2 is a schematic structural diagram illustrating a light guide structure according to an arrangement of the present disclosure. The light guide structure may include a first waveguide layer 1, a polarization beam-splitting structure 3, a first polarization coupling grating 4, a second waveguide layer 5, a second polarization coupling grating 6, and the like.

Figure 3:
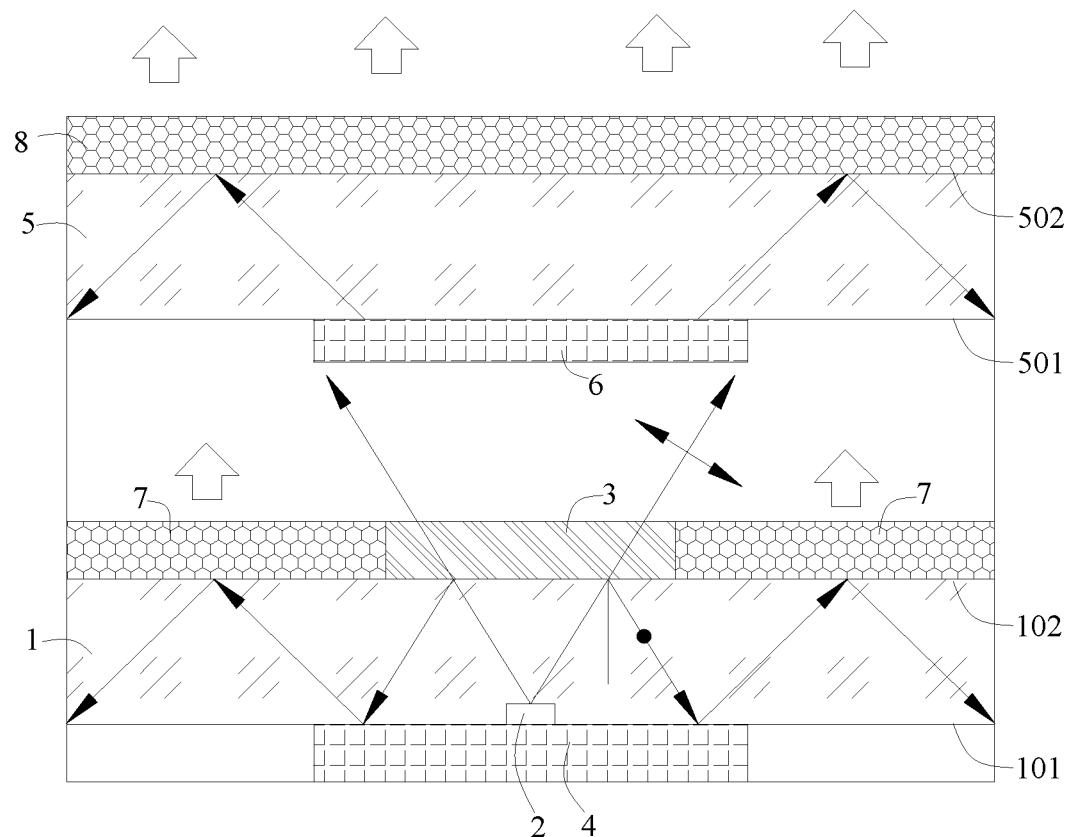
FIG. 3 is a schematic diagram illustrating a basic optical path of FIG. 2.

FIG. 3 is a schematic diagram illustrating a basic optical path of a light guide structure according to an arrangement of the present disclosure. A first waveguide layer 1 includes a first light incident surface 101 and a first light exiting surface 102. A light source 2 may be disposed on the first light incident surface 101 of the first waveguide layer 1. The light source 2 has a light exiting surface disposed opposite to the first light incident surface 101 of the first waveguide layer 1, so that light emitted from the light source 2 can be incident into the first waveguide layer 1 by passing through the first light incident surface 101. A polarization beam-splitting structure 3 can be disposed on the first light exiting surface 102, and may split the light emitted from the light source 2 into first polarized light and second polarized light. Specifically, the first polarized light is reflected by the polarization beam-splitting structure 3 into the first waveguide layer 1, and the second polarized light passes through the polarization beam-splitting structure 3. A first polarization coupling grating 4 is disposed on the first light incident surface 101, and may deflect and totally reflect the first polarized light in the first waveguide layer 1. A second waveguide layer 5 includes a second light incident surface 501 and a second light exiting surface 502, and it can be disposed on the polarization beam-splitting structure 3. A second polarization coupling grating 6 can be disposed between the second light incident surface 501 and the polarization beam-splitting structure 3, and the second polarized light is incident into the second polarization coupling grating 6, and is deflected and then totally reflected by the second polarization coupling grating 6 in the second waveguide layer 5. Alternately, the first polarization coupling grating 4 can be disposed on the first light exiting surface 102, and the first polarized light is reflected into the first waveguide layer 1 by a reflection layer, and is deflected, and then totally reflected in the first waveguide layer 1 by the first polarization coupling grating 4. Alternately, the second polarization coupling grating 6 can be disposed on the second light exiting surface 502, and the second polarized light is first projected into the second waveguide layer 5, and is deflected, and then totally reflected in the second waveguide layer 5 by the second polarization coupling grating 6.

The first waveguide layer 1 is made of a transparent material, which may be selected from materials such as ITO (indium tin oxide) or $Si_3N_4$ (silicon nitride). The first waveguide layer 1 has a thickness which may be set to be 2 μm or more to several tens of micrometers, or set to be several hundreds of nanometers. In this exemplary arrangement, the first waveguide layer 1 may be a transparent dielectric material having a refractive index of about 1.5. The second waveguide layer 5 is also made of a transparent material, which may be selected from materials such as ITO (indium tin oxide) or $Si_3N_4$ (silicon nitride). The second waveguide layer 5 has a thickness which may be set to be 2 μm or more to several tens of micrometers, or set to be several hundreds of nanometers. In this exemplary arrangement, the second waveguide layer 5 may also be a transparent dielectric material having a refractive index of about 1.5.

Figure 4:
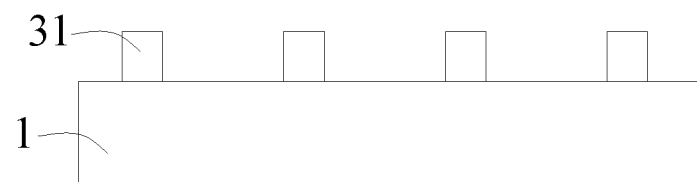
FIG. 4 is a schematic structural diagram illustrating a polarization beam-splitting structure 3 of FIG. 2.

FIG. 4 is a schematic structural diagram illustrating the polarization beam-splitting structure 3. In this exemplary arrangement, the polarization beam-splitting structure 3 may adopt a sub-wavelength metal grating, and the first polarized light may be a polarized light which is formed after being reflected by the polarization beam-splitting structure 3 and has a polarization direction perpendicular to the incident surface, namely, a TE polarized light. The second polarized light may be a polarized light which is formed after passing through the polarization beam-splitting structure 3 and has a polarization direction parallel to the incident surface, namely, a TM polarized light. The first polarized light may also be the TE polarized light, and accordingly, the second polarized light may also be the TM polarized light. The polarization beam-splitting structure 3 may be a metal grating layer 31 directly formed on the first light exiting surface 102 of the first waveguide layer 1. Alternatively, the metal grating layer 31 may be first formed on a transparent substrate, and then the transparent substrate together with the metal grating layer 31 is disposed on the first light exiting surface 102 of the first waveguide layer 1. Since a wavelength of the incident light is smaller than a grating period, when the TM polarized light is incident, oscillation of the electrons along a grid line direction is restricted, at this time, the grating layer acts as a medium layer to the TM polarized light, and the TM polarized light can pass through it. When the TE polarized light is incident, free oscillation of the electrons are excited in a grid direction, and at this time, the TE polarized light is reflected by the grating layer.

Figure 13:
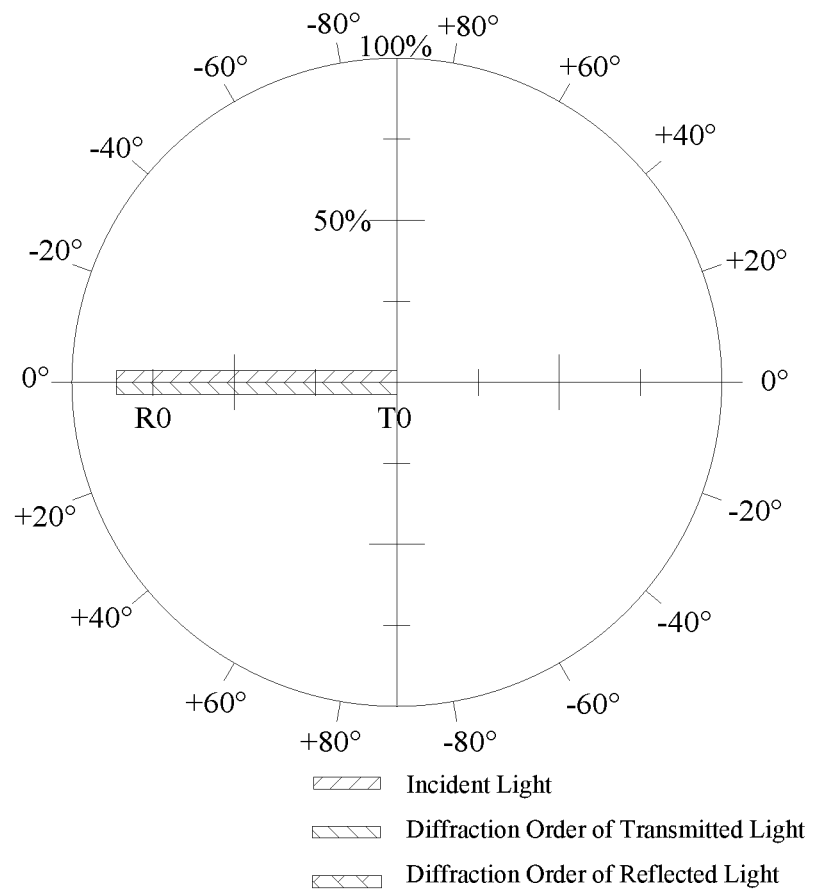
FIG. 13 is a diagram illustrating a simulation result of characteristics of diffraction of a TE polarized light by a polarization beam-splitting structure.
Figure 14:
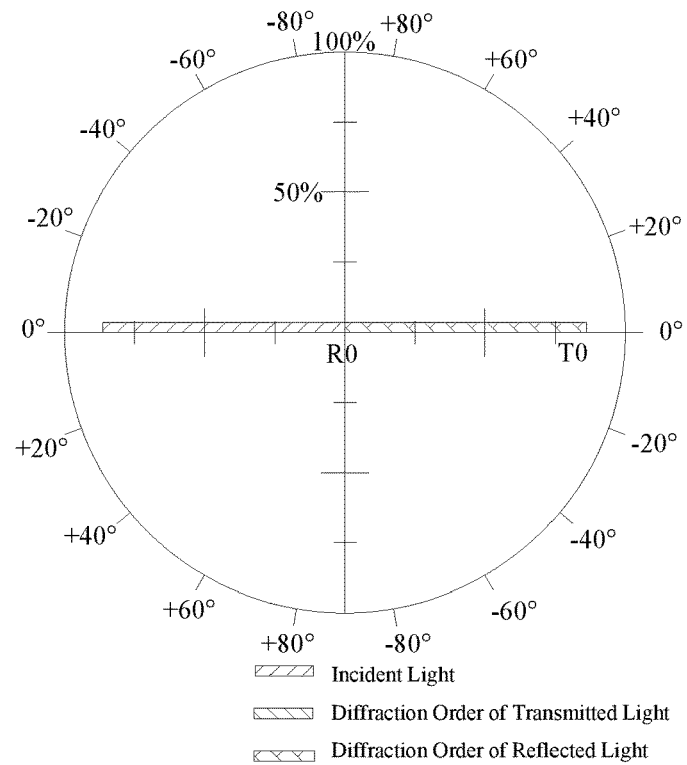
FIG. 14 is a diagram illustrating a simulation result of characteristics of diffraction of a TM polarized light by a polarization beam-splitting structure 3.

The polarization beam-splitting structure 3 can achieve high transmittance of the TM polarized light, and high reflectivity of the TE polarized light, that is, the TM polarized light is in a zero-level transmission and transfer form, and the TE polarized light is in the form of specular reflection. In this exemplary arrangement, specific parameters of the metal grating layer 31 include a period of about 200 nm, a grid height of about 130 nm, and a duty ratio of about 0.5. The metal grating layer 31 is simulated, with an incident wavelength of about 430 nm, and an incident angle of about 0°. FIG. 13 is a diagram illustrating a simulation result of characteristics of diffraction of the TE polarized light by the polarization beam-splitting structure 3. FIG. 14 is a diagram illustrating a simulation result of characteristics of diffraction of the TM polarized light by the polarization beam-splitting structure 3. For the simulation results, reference is made to Table 1, which shows simulation results of diffraction characteristics of the polarization beam-splitting structure 3.

TABLE 1

Simulation Results of Diffraction Characteristics of the Polarization Beam-Splitting Structure 3

| TE Polarized Light | | | TM Polarized Light | | |
|---|---|---|---|---|---|
| Diffraction Order | Angle | Reflectivity (Efficiency) | Diffraction Order | Angle | Transmissivity (efficiency) |
| 1 | 0° | 100% | 1 | 0° | 100% |
| T0 | 0° | 0.37472% | T0 | 0° | 87.137% |
| R0 | 0° | 89.186% | R0 | 0° | 1.1015% |

As can be seen from the figures and Table 1, the reflectivity of the TE polarized light may reach up to 89.186%, and the transmissivity of the TM polarized light may reach up to 87.137%.

Figure 5:
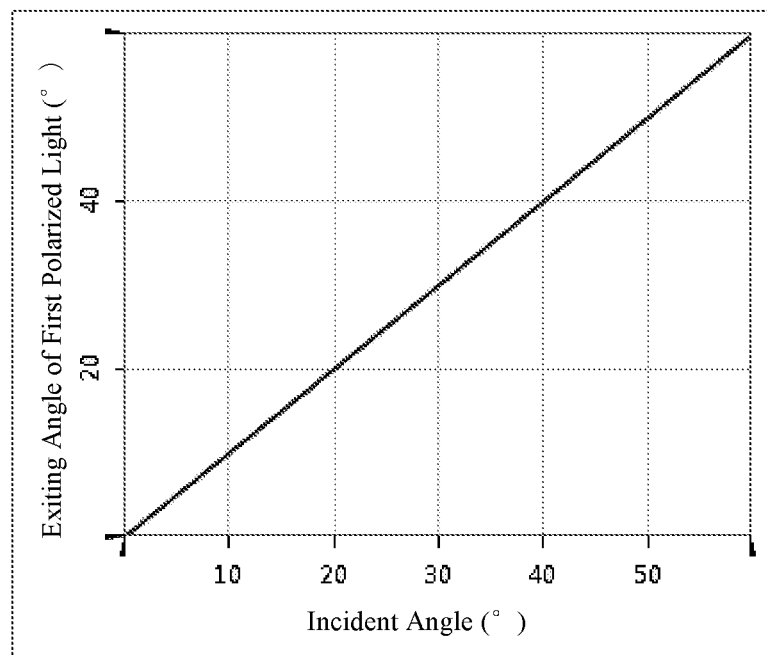
FIG. 5 is a diagram illustrating a relationship between a first polarized light formed by the polarization beam-splitting structure in FIG. 4 and a change in an angle of an incident light.
Figure 6:
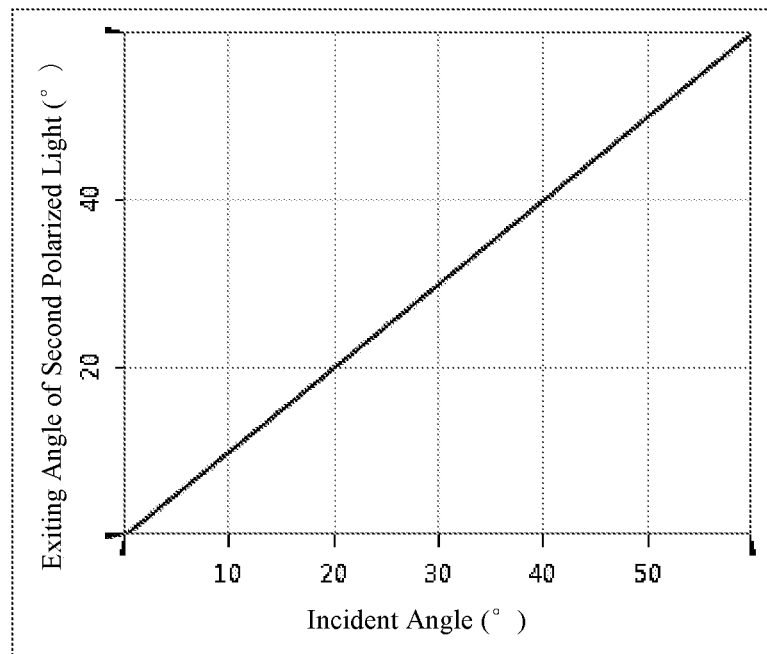
FIG. 6 is a diagram illustrating a relationship between a second polarized light formed by the polarization beam-splitting structure in FIG. 4 and a change in an angle of an incident light.

FIG. 5 is a diagram illustrating a relationship between the first polarized light formed by the polarization beam-splitting structure 3 and a change in an angle of the incident light. FIG. 6 is a diagram illustrating a relationship between the second polarized light formed by the polarization beam-splitting structure 3 and the change in the angle of the incident light. In the present exemplary arrangement, the sub-wavelength metal grating has characteristics of diffraction, polarization and beam-splitting on a light wave; and an angle of diffraction of a diffracted light wave (the transmitted light and reflected light) by the sub-wavelength metal grating varies with a change in an incident angle in a linear manner, that is, an exit angle of the first polarized light relative to the polarization beam-splitting structure 3 is directly proportional to an incident angle of the light source 2 relative to the polarization beam-splitting structure 3, and an exit angle of the second polarized light relative to the polarization beam-splitting structure 3 is directly proportional to the incident angle of the light source 2 relative to the polarization beam-splitting structure 3.

Figure 15:
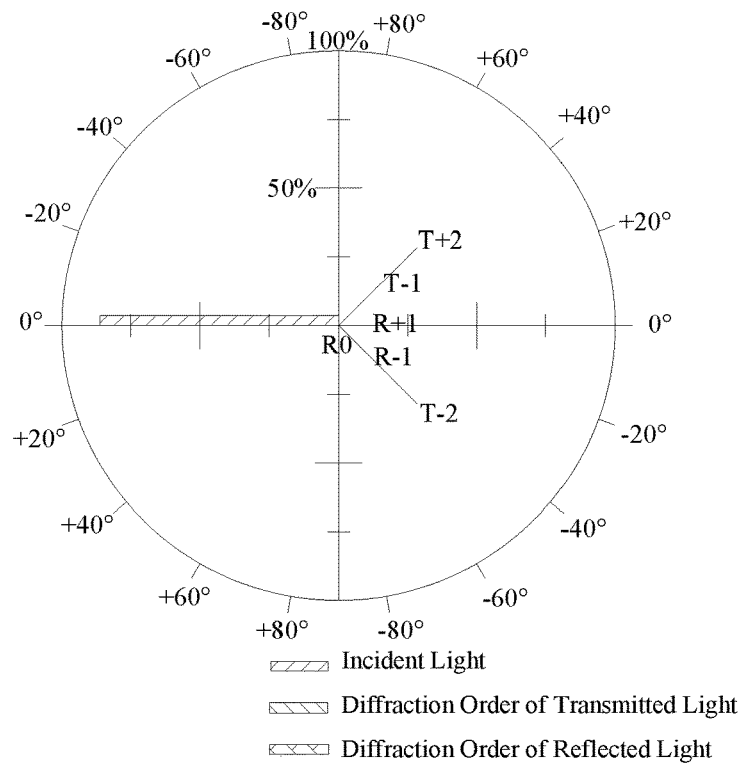
FIG. 15 shows simulation of polarization-sensitive characteristics of the same polarization coupling grating to the TE polarized light.
Figure 16:
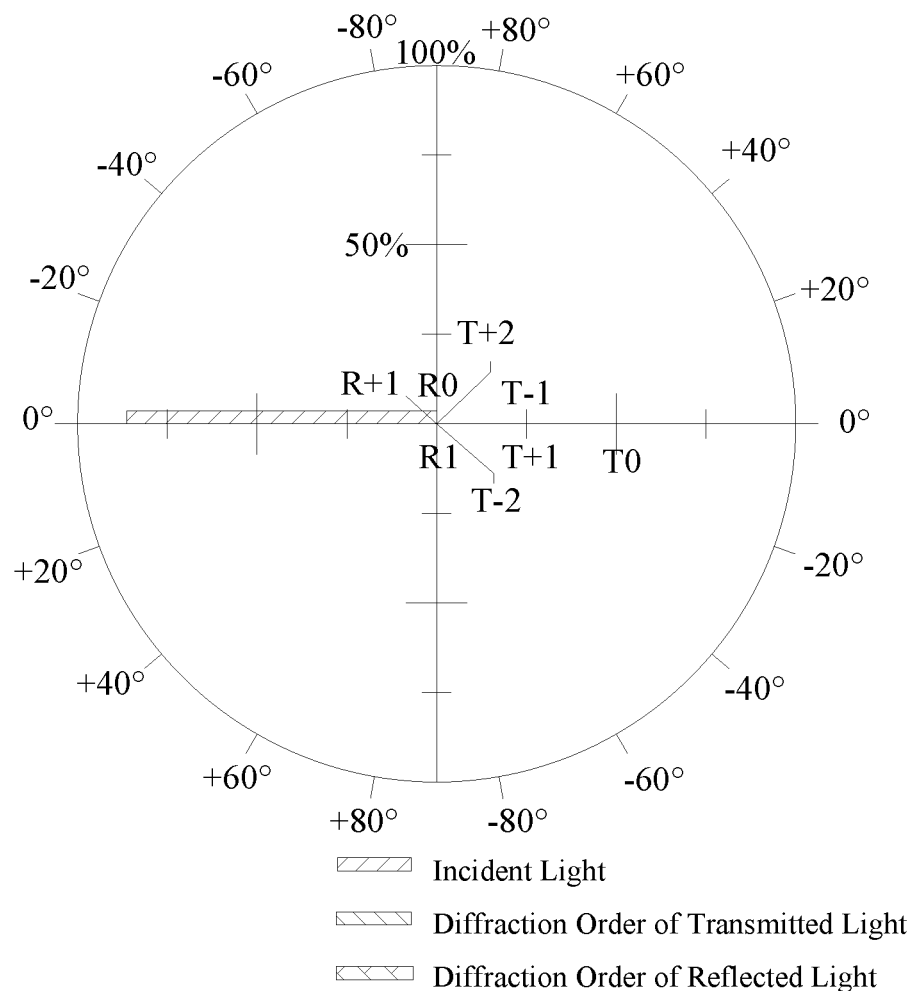
FIG. 16 shows simulation of polarization-sensitive characteristics of the same polarization coupling grating to the TM polarized light.

Light of a LED may need to be efficiently coupled to enter a waveguide layer. For example, both the first polarization coupling grating 4 and the second polarization coupling grating 6 may be of a high density type polarization coupling grating with a period of about 900 nm to 1000 nm, and may be of a multi-step or multi-gap modulation type. However, such gratings have a remarkable feature of polarization dependence, that is, a grating structure can only ensure a high coupling efficiency of a polarized light wave in one mode, but cannot ensure a coupling efficiency of a polarized light wave in the other mode, this will result in that the coupling efficiency can only reach around 50%. FIG. 15 shows simulation of polarization-sensitive characteristics of the same polarization coupling grating to the TE polarized light. FIG. 16 shows simulation of polarization-sensitive characteristics of the same polarization coupling grating to the TM polarized light. As can be seen from the figures that as for the same polarization coupling grating, the coupling efficiency of the TE polarized light can reach up to 81%, and the coupling efficiency of the TM polarized light is only 35%. Therefore, in the present disclosure, the sub-wavelength metal grating is used to polarize and split the light wave of the LED, and then the two polarized lights are coupled by the polarization coupling grating in different modes.

Figure 7:
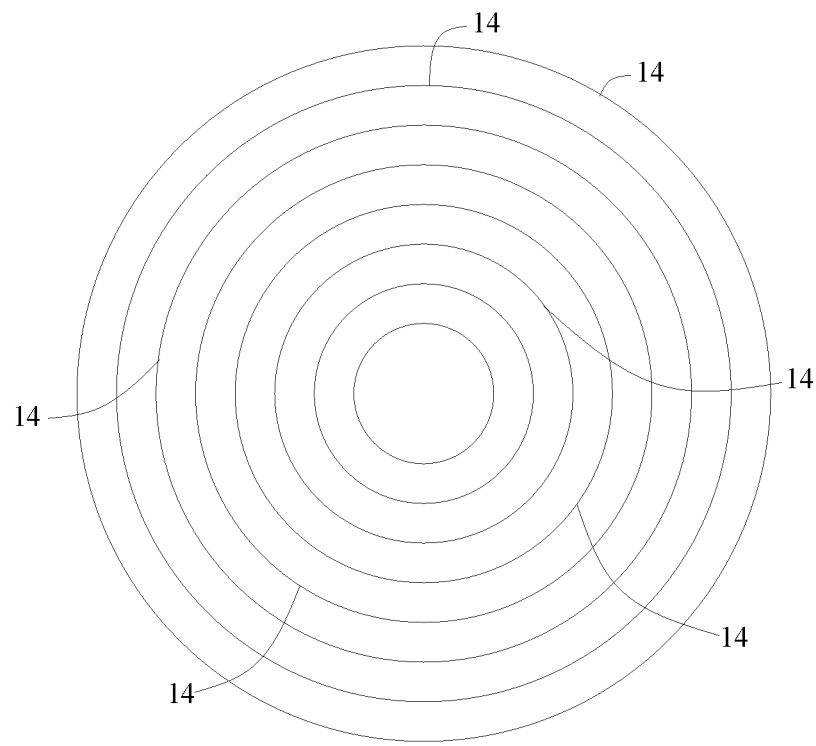
FIG. 7 is a schematic structural diagram illustrating a first polarization coupling grating and a second polarization coupling grating of FIG. 2.

FIG. 7 is a schematic structural diagram illustrating the first polarization coupling grating 4 and the second polarization coupling grating 6. In the exemplary arrangement, the first polarization coupling grating 4 may be a reflection grating layer 41, which is directly disposed on the first light incident surface 101, and the reflection grating layer 41 may include a plurality of concentric annular gratings 14. The plurality of concentric annular gratings 14 have different parameters. The light source 2 and the reflection grating layer 41 are disposed about a concentric axis. The reflection grating layer 41 is made of a metal material, and may have a coupling efficiency up to 85% or more. Similarly, the second polarization coupling grating 6 may be a transmission grating layer 61, which is directly disposed on the second light incident surface 501, and the transmission grating layer 61 may include a plurality of concentric annular gratings 14, each having different parameters. The light source 2 and the transmission grating layer 61 are disposed about a concentric axis. The transmission grating layer 61 may be made of material having a refractive index of 1.8 to 2.0, and may have a coupling efficiency up to 80% or more. Those skilled in the art could understand that since the first polarization coupling grating 4 is disposed on the side of a rear surface of the light source 2, the light source 2 may not be provided with any grating. The first polarization coupling grating 4 may also include a transparent substrate and a reflection grating layer 41 disposed on the transparent substrate. The second polarization coupling grating 6 may also include a transparent substrate and a transmission grating layer 61 disposed on the transparent substrate.

Figure 8:
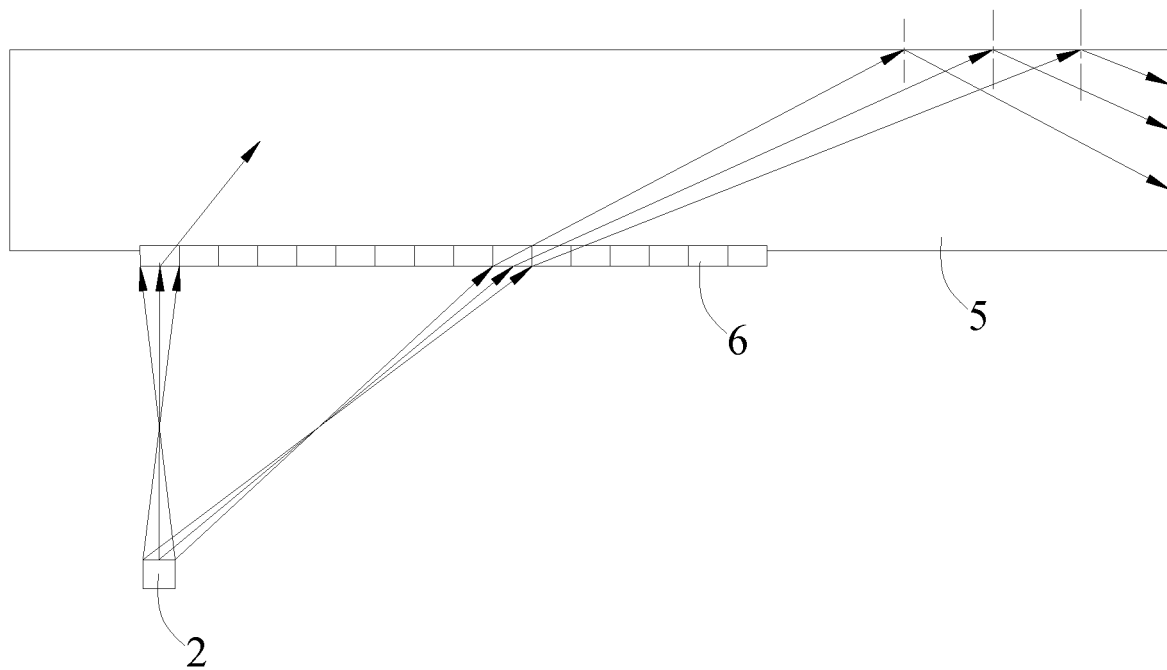
FIG. 8 is a schematic diagram illustrating an optical path of the second polarization coupling grating in FIG. 7.

FIG. 8 is a schematic diagram illustrating an optical path of the second polarization coupling grating 6. Since the first polarization coupling grating 4 and the second polarization coupling grating 6 are very sensitive to the incident angle of the light, for light having different incident angles, the same grating structure will produce different diffraction effects. Meanwhile, a divergence angle of the light is related to an aperture and a size of the light source 2. The aperture of an optical system restricts a divergence angle of the finite-size light source 2. The actual LED luminescence acts like a surface light source 2, and energy is concentrated in the range of +/−60°. In one example, when a polarization coupling grating is designed, a block design can be performed corresponding to a luminescence angle of the LED luminescence. A projection area of the light emitted from the LED is divided into N rings having the same concentric axis, each ring corresponding to a different luminescence angle of the LED. A polarization coupling grating structure is designed for the primary light in the projection area of each of the N rings, as long as the diffraction coupling effect of each polarization coupling grating meets the requirements, that is, one polarization coupling grating is, on the whole, composed of a number of concentric annular gratings 14 having different parameters.

Figure 9:
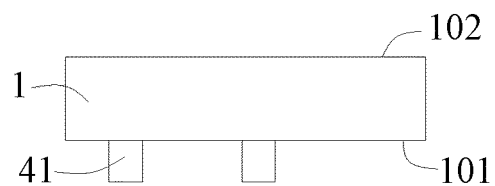
FIG. 9 is a schematic structural diagram illustrating characteristics of one grating in the first polarization coupling grating in FIG. 7.

FIG. 9 is a schematic structural diagram illustrating characteristics of one grating in the first polarization coupling grating 4. Specific parameters of one grating in the first polarization coupling grating 4 include a distance between two grid lines of about 393 nm, a grid height of about 380 nm, a grid line width of about 110 nm, and a period of the grating of about 1000 nm. The one grating of the first polarization coupling grating 4 above-described is simulated with an incident angle of approximately 0°. For the simulation results, reference is made to Table 2, which shows simulation results of polarization, diffraction and coupling of the first polarization coupling grating 4.

TABLE 2

Simulation Results of Polarization, Diffraction and Coupling of the First Polarization Coupling Grating 4

| Diffraction Order | Angle | Coupling Efficiency |
| --- | --- | --- |
| 1 | 0° | 100% |
| T − 2 | −45.181° | 37.217% |
| T − 1 | −20.773° | 0.053034% |
| T0 | 0 | 22.1% |
| T + 1 | 20.773° | 0.98189% |
| T + 2 | 45.181° | 36.231% |
| R − 1 | 32.131° | 0.0020944% |
| R0 | 0° | 3.3459% |
| R + 1 | 32.131° | 0.070106% |

It can be seen from the figure that the coupling efficiency of light in the diffraction order of T−2 and the coupling efficiency of light in the diffraction order of T+2 are the highest, and the coupling efficiency of the first polarization coupling grating 4 can reach 85% or more.

Figure 10:
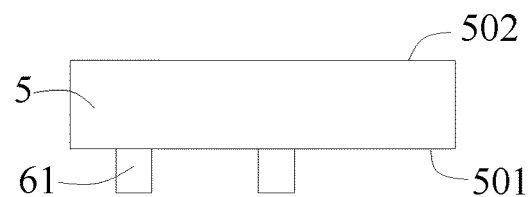
FIG. 10 is a schematic structural diagram illustrating characteristics of one grating of the second polarization coupling grating in FIG. 7.

FIG. 10 is a schematic structural diagram illustrating characteristics of one grating of the second polarization coupling grating 6. Specific parameters of one grating of the second polarization coupling grating 6 include a distance between two grid lines of about 393 nm, a grid height of about 380 nm, a grid line width of about 110 nm, and a period of the grating of about 1000 nm. The above-described one grating of the second polarization coupling grating 6 is simulated, with an incident angle of about 0°. For simulation results, reference is made to Table 3, which shows the simulation results of polarization, diffraction and coupling of the second polarization coupling grating 6.

TABLE 3

Simulation Results of Polarization, Diffraction and Coupling
of the Second Polarization Coupling Grating 6

| Diffraction Order | Angle | Coupling Efficiency |
|---|---|---|
| 1 | 0° | 100% |
| T − 2 | −45.181° | 41.876% |
| T − 1 | −20.773° | 0.022882% |
| T0 | 0 | 9.0801% |
| T + 1 | 20.773° | 0.0023123% |
| T + 2 | 45.181° | 41.898% |
| R − 1 | 32.131° | 0.0019945% |
| R0 | 0° | 7.1177% |
| R + 1 | 32.131° | 0.0010525% |

It can be seen from the figure that the coupling efficiency of light in the diffraction order of T−2 and the coupling efficiency of light in the diffraction order of T+2 are the highest, and the coupling efficiency of the second polarization coupling grating 6 can reach 80% or more.

Figure 11:
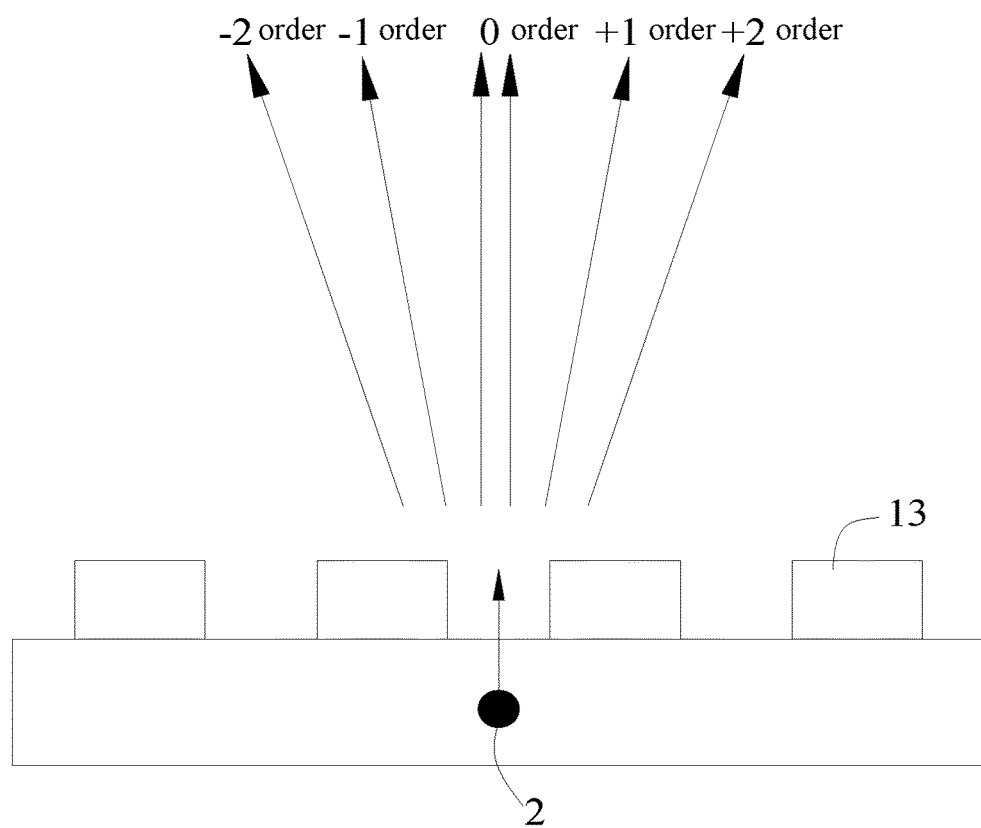
FIG. 11 is a schematic diagram illustrating diffraction in respective orders of grating.

FIG. 11 is a schematic diagram illustrating diffraction in respective orders of grating 13, diffracted light in a desired order can be derived from a grating equation: $n_1 \sin \theta_1 - n_2 \sin \theta_2 = mP/\lambda$.

In the equation, m represents grating series, $m=0, \pm 1, \pm 2 \ldots$; $n_1$ represents a refractive index of a medium where the incident light is located, $\theta_1$ represents an incident angle, $n_2$ represents a refractive index of a medium where the exit light is located, $\theta_2$ represents a diffraction angle, and $\lambda$ represents a wavelength.

FIG. 3 is a schematic diagram illustrating a basic optical path of a direct type backlight module. A light exiting mesh layer may be disposed on both sides of the first waveguide layer 1 and on both sides of the second waveguide layer 5, and may also be disposed on one side of the first waveguide layer 1 and one side of the second waveguide layer 5. In the present exemplary arrangement, the light exiting mesh layer is disposed at a position of the first light exiting surface 102 where no polarization beam-splitting structure 3 is provided so as to form a first mesh layer 7, and the light exiting mesh layer is further disposed on the second light exiting surface 502 to form a second mesh layer 8. Uniform distribution of a luminous intensity of backlight may be achieved by the first mesh layer 7 and the second mesh layer 8. The light exiting mesh layer may be a commonly used light exiting mesh in the prior art, which has a size of 0.1~1 mm, or may be a configured grating structure. Of course, in other exemplary arrangements of the present disclosure, the first mesh layer 7 may also be disposed at a position of the first light incident surface 101 where no first polarization coupling grating 4 is provided; and the light exiting mesh layer may also be disposed at a position of the second light incident layer 501 where no second polarization coupling grating 6 is provided to form a third light exiting mesh layer.

Figure 12:
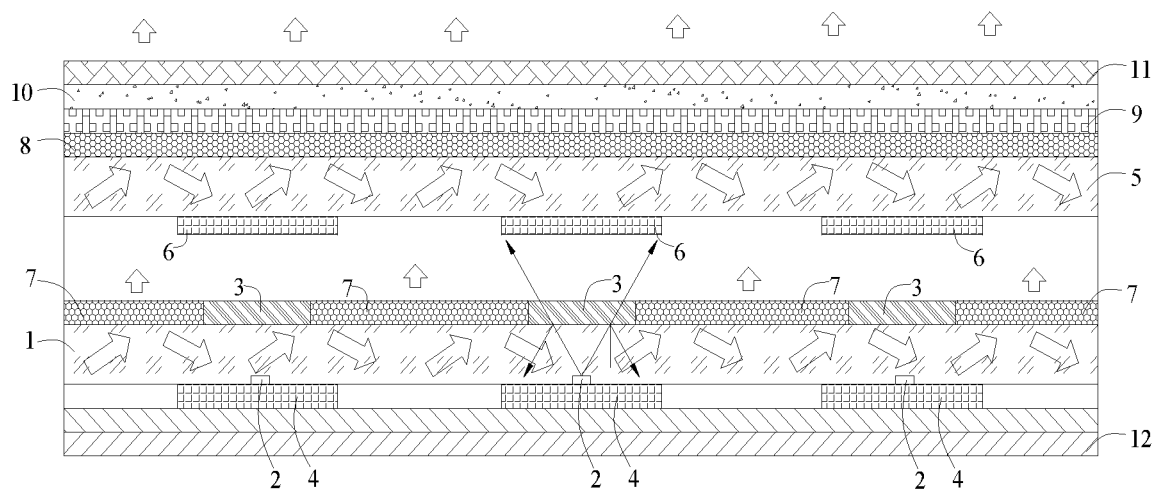
FIG. 12 is a schematic structural diagram illustrating a direct type backlight module according to an arrangement of the present disclosure.

Further, the present disclosure also provides a direct type backlight module. FIG. 12 is a schematic structural diagram illustrating a direct type backlight module according to an arrangement. The direct type backlight module may include the light source 2, the light guide structure, and the like. The specific structure and principle of the light guide structure have been described in detail above, and will not be elaborated herein again.

The light source 2 can be an LED or an OLED. A color of light emitted from the light source 2 may be blue or ultraviolet. In this exemplary arrangement, by adopting a Micro-LED technology, a high-density LED can be integrated in a small size, and LED particles are directly transferred onto the first light incident surface 101 of the first waveguide layer 1, and a light exiting surface of the LED is disposed opposite to the first light incident surface 101 of the first waveguide layer 1 so that the light emitted from the light source 2 is incident into the first waveguide layer 1 by passing through the first light incident surface 101.

Further, the direct type backlight module may further include a fluorescent layer 9, which may be disposed on a side of the second mesh layer 8 away from the second waveguide layer 5. The fluorescent layer 9 is used for mixing monochromatic light of a LED into a white light to be emitted, as for the matching of the LED and the fluorescent layer 9, a blue LED and a Ce:YAG fluorescent powder may be provided, and the Ce:YAG fluorescent powder is a main fluorescent powder for industrially producing white LEDs. A method for manufacturing the white LEDs is generally to excite YAG:Ce rare earth fluorescent powder with a blue light emitted from a high-efficiency InGaN/GaN (nitrogen gallium indium/gallium nitride)-based blue LED. The Ce:YAG fluorescent powder is excited to emit a yellow light to be mixed with the remaining blue light so that a white light is formed. White light LED technology is of great significance to the rational use of energy, mitigation of energy crisis and green lighting. The main synthetic methods include a high temperature solid phase reaction method, a sol-gel method, a spray pyrolysis method, a coprecipitation method and the like. A purple LED and a RGB trichromatic fluorescent powder may also be used, and white LEDs fabricated by exciting "RGB" trichromatic fluorescent powder with a purple light have features such as low color temperature, uniform light color, good color rendering, no glare phenomenon, and simple manufacturing processes. A blue LED and a quantum dot fluorescent layer may also be used. In a semiconductor material, fine crystals are generally referred to as quantum dots. Such quantum dots can lock electrons in a very small three-dimensional space, and when a beam of light is irradiated thereon, the electrons are excited to jump to a higher energy level; and when returning to the original lower energy level, the electrons emit a beam of light of a certain wavelength.

Referring to FIG. 1, further, the direct type backlight module may further include a diffusion sheet 10, which may be disposed on a side of the fluorescent layer 9 away from the second mesh layer 8. The backlight may be uniformly distributed by the diffusion sheet 10. A base material of the diffusion sheet 10 needs to be selected from materials having high light transmittance such as PET plastic (polyethylene terephthalate plastic)/PC plastic (polycarbonate)/PMMA resin (polymethyl methacrylate). Generally, as for a conventional diffusion sheet 10, chemical particles are mainly added to the base material of the diffusion sheet 10 as scattering particles, but as for an existing diffusion sheet 10, fine particles thereof are dispersed in a resin layer, so that when light passes through the diffusion layer, the light will continuously pass through two media with different refractive indexes, and at the same time, the light will undergo many refraction, reflection and scattering phenomena, thus achieving the effect of optical diffusion. The structure of the diffusion sheet 10 generally includes an anti-static coating layer, a PET base material, and a diffusion layer from bottom to top.

Further, the direct type backlight module may further include a prism layer 11, which may be disposed on a side of the diffusion sheet 10 away from the fluorescent layer 9. The prism layer 11 can improve the luminous efficiency of the whole backlight module, that is, further utilize energy emitted from the light source 2. The prism layer 11 is formed by laminating a prism layer 11 having a sharp-angled microprism structure and a waveguide layer. The prism layer 11 may also be referred to as a brightness enhancement film, and there are mainly four types, including a normal prism sheet, a multi-function prism sheet, a micro-lens film, and a reflective polarizer.

Further, the direct type backlight module may further include a reflective layer 12, which is disposed on a side of the first polarization coupling grating 4 away from the first waveguide layer 1. There is inevitably a reflection and diffraction loss, which is generally less than 5%, of LED light of the high-density polarization coupling grating, therefore, the reflective layer 12 is provided so that the light having the reflection and diffraction loss is reused for backlight. The reflective layer 12 may be a metal film layer or a multilayer dielectric film.

Further, the present disclosure further provides a display panel, which includes the above backlight module, and the specific structure of the backlight module has been described in detail above, which will not be elaborated herein.

In the present disclosure, in the light guide structure, the direct type backlight module mounted with the light guide structure, and the display panel mounted with the direct type backlight module, the light emitted from the light source 2 is divided into the first polarized light and the second polarized light by the polarization beam-splitting structure 3, and then the first polarized light is deflected by the first polarization coupling grating 4 to be totally reflected in the first waveguide layer 1, and the second polarized light is deflected by the second polarization coupling grating 6 to be totally reflected in the second waveguide layer 5. In one aspect, by using the light guide structure, there is no light mixing distance existing, which is advantageous for the thinning design of the backlight module; in the other aspect, the light in the first waveguide layer 1 and the second waveguide layer 5 is relatively uniform by total reflection; in a third aspect, there is no requirement for spacing between the light sources 2 in the light guide structure, and the number of the light sources 2 can be decreased to reduce the cost under the premise of guaranteeing the overall brightness.

The features, structures, or characteristics described above may be combined in any suitable manner in one or more arrangements, and the features discussed in the various arrangements are interchangeable, if possible. In the above-mentioned descriptions, numerous specific details have been set forth to provide adequate understanding of the arrangements of the present disclosure. However, those skilled in the art will appreciate that the technical solutions of the present disclosure may be practiced without one or more of the specific details, or other methods, components, materials, and the like may be employed. In other instances, well-known structures, materials or operations will not be shown or described in detail to avoid obscuring the aspects of the present disclosure.

The terms "about" or "approximately" as used in this specification generally means 20%, preferably 10%, and more preferably 5% of a specified value or range. The number given herein is an approximate number, it means that the number may contain the meaning of "about", "approximately", "around" and "nearly" without particular descriptions.

Although relative terms such as "upper" and "lower" are used in the specification of the present disclosure to describe the relationships of one component relative to another component, these terms are used in this specification to be illustrative of the present disclosure, for example, the direction of the example described the accompanying drawings. It will be understood that if the device is upside down, an "upper" component described above will become a "lower" component. When a structure is "on" another structure, it is possible that the structure is integrally formed on the another structure, or that the structure is "directly" disposed on the another structure, or the structure is "indirectly" disposed on the another structure through other structure.

In the present specification, terms "a", "an", "the" and "said" are used to denote the presence of one or more elements/constituent parts/etc; terms "comprising", "including" and "having" represent open including and refer to additional elements/constituent parts/etc in addition to the listed elements/constituent parts/etc; terms "first", "second" and "third" are only used as a token, rather than a limit on the number of objects.

It should be understood that the present disclosure is not limited to the detailed structure and arrangement manner of the components mentioned in the present disclosure. The present disclosure may include other arrangements and may be implementable and carried out in various manners. The foregoing variations and modifications fall into the scope of the present disclosure. It is to be understood that the present disclosure disclosed and claimed herein extends to all alternative combinations of two or more individual features that are mentioned or apparent in the text and/or drawings. All of these different combinations constitute a number of alternative aspects of the present disclosure. The arrangements described in the specification are illustrative of the best mode for carrying out the present disclosure and will enable those skilled in the art to utilize the present disclosure.

What is claimed is:

1. A light guide structure, comprising:
    a first waveguide layer having a first light incident surface and a first light exiting surface;
    a polarization beam-splitting structure disposed on the first light exiting surface, and configured to split light emitted from a light source into first polarized light and second polarized light;
    a first polarization coupling grating disposed on the first light incident surface and configured to deflect the first polarized light and allow the first polarized light to be totally reflected in the first waveguide layer;
    a second waveguide layer having a second light incident surface and a second light exiting surface and disposed on the polarization beam-splitting structure; and
    a second polarization coupling grating disposed between the second light incident surface and the polarization beam-splitting structure and configured to deflect the second polarized light and allow the second polarized light to be totally reflected in the second waveguide layer.

2. The light guide structure according to claim 1, wherein the first polarized light has a polarization direction perpendicular to an incident surface, and the second polarized light has a polarization direction parallel to the incident surface.

3. The light guide structure according to claim 1, wherein the first polarization coupling grating comprises:
    a reflection grating layer disposed on the first light incident surface;
    the second polarization coupling grating comprises:
    a transmission grating layer disposed on the second light incident surface.

4. The light guide structure according to claim 3, wherein the transmission grating layer and the reflection grating layer each comprises a plurality of concentric annular gratings, the plurality of concentric gratings having different parameters.

5. The light guide structure according to claim 4, wherein the light source, the first polarization coupling grating and the second polarization coupling grating are disposed about a concentric axis.

6. The light guide structure according to claim 1, wherein the polarization beam-splitting structure comprises:
   a metal grating layer disposed on the first light exiting surface.

7. The light guide structure according to claim 6, wherein parameters of the metal grating layer comprise a period of 200 nm, a grid height of 130 nm, and a duty ratio of 0.5.

8. The light guide structure according to claim 1, wherein the light guide structure further comprises:
   a first mesh layer disposed at a position of the first light exiting surface where no polarization beam-splitting structure is provided and/or a position of the first light incident surface where no first polarization coupling grating is provided.

9. The light guide structure according to claim 8, wherein the light guide structure further comprises:
   a second mesh layer disposed at a position of the second light exiting surface and/or the second light incident surface where no second polarization coupling grating is provided.

10. The light guide structure according to claim 1, wherein the light guide structure further comprises:
    a second mesh layer disposed at a position of the second light exiting surface and/or the second light incident surface where no second polarization coupling grating is provided.

11. A direct type backlight module, comprising:
    the light guide structure according to claim 1, and
    a light source disposed opposite to the first waveguide layer and located between the first light incident surface and the first polarization coupling grating.

12. The direct type backlight module according to claim 11, wherein the light guide structure further comprises a second mesh layer, which is disposed at a position of the second light exiting surface and/or the second light incident surface where no second polarization coupling grating is provided; the direct type backlight module further comprises:
    a fluorescent layer disposed on a side of the second mesh layer away from the second waveguide layer.

13. The direct type backlight module according to claim 12, wherein the direct type backlight module further comprises:
    a diffusion sheet disposed on a side of the fluorescent layer away from the second mesh layer;
    a prism layer disposed on a side of the diffusion sheet away from the fluorescent layer; and
    a reflective layer disposed on a side of the first polarization coupling grating away from the first waveguide layer.

14. A display panel, comprising:
    the direct type backlight module according to claim 11.

15. A direct type backlight module, comprising:
    the light guide structure according to claim 2, and
    a light source disposed opposite to the first waveguide layer and located between the first light incident surface and the first polarization coupling grating.

16. A direct type backlight module, comprising:
    the light guide structure according to claim 3, and
    a light source disposed opposite to the first waveguide layer and located between the first light incident surface and the first polarization coupling grating.

17. A direct type backlight module, comprising:
    the light guide structure according to claim 4, and
    a light source disposed opposite to the first waveguide layer and located between the first light incident surface and the first polarization coupling grating.

18. A direct type backlight module, comprising:
    the light guide structure according to claim 5, and
    a light source disposed opposite to the first waveguide layer and located between the first light incident surface and the first polarization coupling grating.

19. A display panel, comprising:
    the direct type backlight module according to claim 12.

20. A display panel, comprising:
    the direct type backlight module according to claim 13.

* * * * *